Feb. 15, 1966     D. O. LEIBY     3,234,895
MEANS FOR PREPARING DOUGH FOR COOKING
Filed Jan. 23, 1963
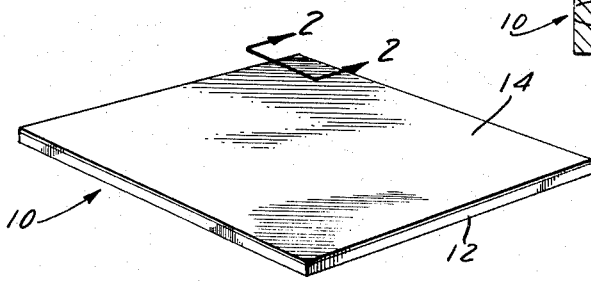
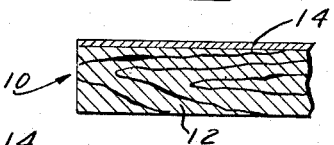
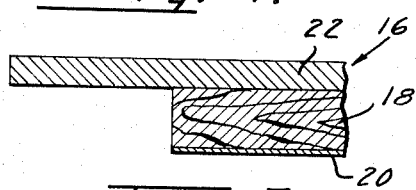
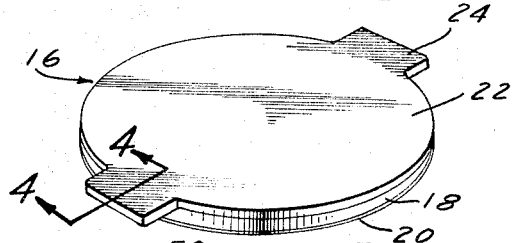
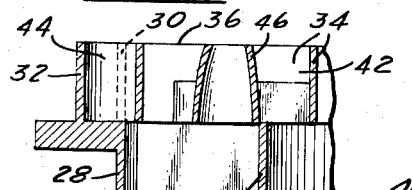
Dayton O. Leiby,
INVENTOR.
BY *J.O.Baisch*
Attorney

United States Patent Office 3,234,895
Patented Feb. 15, 1966

3,234,895
MEANS FOR PREPARING DOUGH FOR COOKING
Dayton O. Leiby, 835 Stuhr Drive,
San Gabriel, Calif. 91775
Filed Jan. 23, 1963, Ser. No. 253,417
4 Claims. (Cl. 107—47)

This invention relates generally to a means for preparing dough for cooking and relates more particularly to means for effecting separation of a mass of dough into smaller pieces of predetermined size, shape and weight.

Such preparation of dough for cooking involves certain problems and difficulties, particularly in the making of doughnuts, tarts, bars, twists, buns, biscuits, Parker House rolls, and like baked goods in the commercial field, and it is an object of the present invention to solve these problems and overcome said difficulties.

It is another object of the invention to provide equipment for sheeting, forming, dividing and cutting masses of dough preparatory to the cooking thereof.

Still another object of the invention is to provide novel means for sheeting dough.

A further object of the invention is to provide novel means for forming and dividing sheeted dough.

It is a still further object of the invention to provide means whereby all identical pieces are of substantially the same weight.

It is another object of the invention to provide an apparatus of this character whereby the dough may be easily and quickly processed and formed into the desired pieces preparatory to cooking.

It is a further object of the invention to provide an apparatus of this character that will produce perfect forms that do not have to be worked afterward.

As is well known, the preparing of dough pieces in the proper shape for doughnuts and other baked goods referred to above heretofore has required long experience to get said pieces ready and cut or formed uniformally.

It is therefore a further object of the invention to provide an apparatus whereby unskilled workers can be trained within a few hours to turn out expert work. In other words, with the present equipment an expert may be made out of a novice in a matter of a few hours.

It is a still further object of the invention to provide equipment of this character whereby pieces of dough, such as jelly rolls, for example, are formed so as to require no additional hand work therefor.

Another object of the invention is to provide apparatus of this character that is simple in construction.

Still another object of the invention is to provide apparatus of this character that is easy to use.

A further object of the invention is to provide apparatus of this character that is relatively inexpensive to manufacture.

The characteristics and advantages of the invention are further sufficiently referred to in connection with the following detailed description of the accompanying drawings, which represent one embodiment. After considering this example skilled persons will understand that many variations may be made without departing from the principles disclosed, and I contemplate the employment of any structures, arrangements or modes of operation that are properly within the scope of the appended claims.

Referring to the drawings, which are for illustrative purposes only:

FIG. 1 is a perspective view of the cutting board;
FIG. 2 is a sectional view thereof taken on line 2—2 of FIG. 1;
FIG. 3 is a perspective view of the sheeter;
FIG. 4 is a sectional view thereof taken on line 4—4 of FIG. 3;
FIG. 5 is a top plan view of one side of the cutter divider;
FIG. 6 is a fragmentary plan view of the opposite side of the cutter divider; and
FIG. 7 is a sectional view taken on line 7—7 of FIG. 5.

Referring more particularly to FIGS. 1 and 2, the cutting board is of suitable size, shape and area for sheeting a mass of dough to the required size for the cutting and dividing of said sheet of dough. The cutting board, indicated generally at 10, is formed of a piece of material 12 which may be a piece of wood, plywood, or any other suitable material. The piece of wood 12 may be termed the cutting board base and on the top surface thereof is a relatively thin sheet 14 of a hard, nonporous material which is secured by means of any well known adhesive or the like which provides a sanitary surface. Tempered "Masonite" is one example of a material that serves the purpose very well.

Referring to FIGS. 3 and 4, the sheeter is indicated generally at 16 and comprises a circular piece of material 18 of wood, plywood, or other suitable material, the piece 18 being termed herein the sheeter base. The under side of the sheeter base has secured thereto, by a suitable adhesive or the like, a sheet 20 of tempered "Masonite" or other material having similar characteristics to provide a sanitary surface. To the upper side of the sheeter base 18 is secured, by any suitable means, such as an adhesive, screws or the like, a top member or plate 22 of heavy material, such as cast iron or the like. Plate 22 has oppositely arranged handles 24 which extend outwardly of the plate 22 and beyond the sheeter base 18, so that there will be clearance between the handles and the cutting board or other surface upon which the dough is placed for sheeting.

Referring to FIGS. 5, 6 and 7, there is shown the cutter-divider. One side of the cutter-divider is adapted to cut sheeted dough into suitable pieces for doughnuts, bowties, or bars and tarts. The opposite side of the cutter-divider is adapted to cut sheeted dough into suitable forms for jellies and various other types of pastry and/or baked goods, such as rolls, tarts, Parker House rolls, and the like.

The cutter-divider comprises a peripheral wall, indicated generally at 27. One side or end portion 28, in FIG. 6, is cylindrical. The other side or end portion has portions 30, FIG. 5, axially continuous with the cylindrical wall 28. The wall 28 and the portions 30 have a radius based on the center or axis 31 of the cutter-divider. Arcuate portions 30 are of equal length and are connected by arcuate portions 32 each having a substantially shorter radius than the portions 30.

Referring particularly to FIG. 5, the portions 30 and 32 form a peripheral wall for the doughnut and bow-tie cutting side of the device, the space within said peripheral wall being partitioned so as to provide a plurality of hexagonal forms, the walls 34 of which have free edges 36 for cutting sheets of dough into suitable forms for doughnuts.

In FIG. 5 there is a center form 38 about which are six forms 40 and about the forms 40 are disposed forms 42. It is to be noted that the inner forms 38 and 40 have certain common walls. The forms 42 also have walls common with forms 40 but also have outer walls that are termed outer walls.

Certain of the outer forms 42 have portions projecting toward the respective arcuate portions 32 of the peripheral wall at their greatest distance from the center 32 of the device. Outer walls of the forms are connected to the respective adjacent arcuate portions 32 by partitions 44 which are radial with respect to the axis 31.

Centrally of each of the hexagonal forms is a tubular member 46 which extends longitudinally relative to the device for cutting the holes in the dough pieces to be cooked into doughnuts.

Thus, at one side of the cutter-divider the hexagonal forms with their tubular members are adapted to cut the dough for doughnuts. On the same side of the device there is provision for cutting bow-ties or bars by the walls defining the spaces 50, said walls being the respective peripheral wall portions between the partitions 44 and the adjacent walls of the hexagonal forms, said partitions 44 defining the ends of said spaces 50.

The opposite side of the cutter-divider has a pair of diametrically extending walls 54 and 56 normal to each other and dividing the space defined by the cylindrical wall 28 into four equal segments or parts. This space is also provided with an inner cylindrical wall 58 concentric with the wall 28 and an outer cylindrical wall 60 concentric with the walls 58 and 28 and positioned immediately of said walls.

The space defined by the inner cylindrical walls 58 is divided into four equal sections or segments 62 by the parts 54a and 56a of the partitions 54 and 56.

The space between the inner cylindrical walls 58 and the outer cylindrical walls 60 is divided into a plurality of spaces 64 by the portions 54b and 56b of the partitions 54 and 56 extending between said cylindrical walls 58 and 60 and intermediate radial walls 66 extending between the cylindrical walls 58 and 60.

The space between the outer cylindrical wall 60 and the peripheral cylindrical wall 28 is similarly divided by the portions 54c and 56c of the partitions 54 and 56 disposed between the cylindrical walls 58 and 28. Between the wall portions 54c and 56c are radially extending walls or partitions 68. Thus, the space between the cylindrical walls 58 and 28 is divided into a plurality of spaces 70 which are of similar shape and size as the spaces 64. It is to be noted that the spaces 62, 64, and 70 are of such size that when a sheet of dough is cut with the device the pieces of dough in said spaces are of equal thickness and weight. Likewise, the pieces of dough cut for making doughnuts by the other side of the device are of equal size and weight and the same is true of the bow-ties cut by said other side. In other words, all identical pieces are of substantially the same weight.

A plurality of radially extending handles 74 are provided about the periphery of the cutter-divider and these handles are intermediate the ends of the cutter-divider so that they will be spaced from the adjacent surface of a cutting board or other dough supporting element, whichever side of the cutter-divider is used. Thus there is clearance for the fingers of the user.

The cutter-divider is formed of any suitable material, aluminum being particularly satisfactory, although any other suitable material may be used. The device is cast and the opposite sides or ends are Blanchard ground so that the free or cutting edges at the opposite ends or sides of the device are in respective common planes and such edges are true flat surfaces and not sharp cutting edges.

In using the present equipment a certain size of loaf is scaled off and placed on the cutting board, where it is allowed to rise about fifteen minutes, or any other suitable time. The operator lets it relax until it can be turned over on the cutting board. If desired the loaf may be pressed with the hand.

The sheeter is then placed on the loaf and the dough thereof squeezed to the outside perimeter, said sheeter being given twisting motions back and forth as on the axis thereof as pressure is applied downwardly on the dough. The dough is thus squeezed until it extends outwardly of the perimeter of the sheeter to allow for shrinkage, the normal shrinkage being approximately a half-inch beyond the perimeter of the sheeter. The shrinkage allowance is provided only for dough for raised doughnuts or the like.

The circular twisting movement manually applied to the sheeter has an effect equal to many times the pressure with a press. It has been found that a sheeter which weighs approximately 25-pounds will readily sheet dough that would require 300-pounds to 400-pounds pressure with a press.

When the piece of dough is sheeted it expands outwardly from the center and shrinks towards the center. By sheeting the dough until there is the extension of sheet beyond the perimeter of the sheeter, the sheet will shrink to the desired size when the sheeter is removed, such size being substantially the diameter of the divider-cutter, so that when the latter is applied to the sheet substantially the entire sheet will be cut or divided to form the dough into the proper size and form for making doughnuts or for cutting the sheet or the baked goods formed or cut by the opposite side of the cutter-divider which makes perfect forms which do not have to be worked afterward, except the twists, which are formed by hand.

In cutting the sheet with the cutter-sheeter the device is pressed downwardly onto the sheet with a twisting motion and then raised, the cut pieces of dough then dropping from the spaces provided therefor in the device.

It is to be noted that the cutting edges are of substantial width and are flat. With this arrangement the cutting edges do not cut through the normal dry skin of the dough but cut by a squeezing action so that the skin is not broken to expose the interior of the sheet which would stick to the walls of the forms upon contact therewith. In other words, the flat cutting edges prevent the dough from sticking to the walls defining the various forms.

The present apparatus may be used for any kind of pastry or baked goods. Cake doughnuts may be made as well as the raised doughnuts or other items.

The invention and its attendant advantages will be understood from the foregoing description and it will be apparent that various changes may be made in the form, construction and arrangement of the parts of the invention without departing from the spirit and scope thereof or sacrificing its material advantages, the arrangements and steps hereinbefore described being merely by way of example, and I do not wish to be restricted to the specific forms shown or uses mentioned except as defined in the accompanying claims, wherein various parts or portions have been separated for clarity of reading and not for emphasis.

I claim:

1. Apparatus for preparing and cutting dough into shapes preparatory to cooking same, comprising:

(A) a cutting board having a flat planer non-porous surface;

(B) a sheeter, said sheeter comprising a circular base with a flat bottom surface, a sheet of non-porous material secured to the bottom surface of said base, and a top plate of relatively heavy material secured to the top of said base, said plate having oppositely extending handles thereon;

(C) and a cast, unitary cutter-divider comprising a peripheral wall, one end portion of said peripheral wall being cylindrical while the other end portion thereof comprises arcuate portions in the plane of the cylindrical portion and outwardly bulging arcuate parts connecting said arcuate portions together, the interior space defined by the portions of the peripheral wall at said other side being divided by walls into hexagonal forms, there being a central hexagonal form, six intermediate hexagonal forms about said central form, and a plurality of outer hexagonal forms surrounding the intermediate hexagonal forms, said forms having certain walls in common with each other, a tubular doughnut hole cutting element centrally positioned in the center of each hexagonal form, the outer group of hexagonal forms having outer free walls, parts of certain of said outer forms extending toward the bulging portions of the peripheral wall, partitions connecting the walls of the bulging portions with the adjacent walls of adjacent hexagonal forms, diametrically extending partitions dividing the cylindrical end portion of the peripheral wall into four equal parts, a central axial cylindrical inner wall and a concentric outwardly spaced intermediate cylindrical wall spaced inwardly from a cylindrical peripheral wall;

(D) radially extending partition walls between the central cylindrical wall, intermediate cylindrical wall and the cylindrical peripheral wall dividing the interior of the cylindrical portion of the device into a plurality of forms of substantially equal size and shape, the free edges of the various walls at each end of the cutter-divider being in the same plane and said edges being flat cutting edges, and a plurality of annularly spaced radially extending handles on the exterior of the peripheral wall, said handles being intermediate the ends of the peripheral wall;

(E) the area of the flat bottom surface of the sheeter being substantially the same as the area encompassed by the peripheral wall of the cutter-divider.

2. A cutter-divider for cutting dough into shaped pieces preparatory to cooking same, comprising:

(A) a peripheral wall, one end portion of said peripheral wall being cylindrical while the other end portion thereof comprises arcuate portions in the plane of the cylindrical portion and outwardly bulging arcuate parts connecting said arcuate portions together;

(B) form defining walls partitioning the interior space defined by the portions of the peripheral wall at said other side into hexagonal forms, there being a central hexagonal form, six intermediate hexagonal forms about said central form, and a plurality of outer hexagonal forms surrounding the intermediate hexagonal forms, said forms having certain walls in common with each other;

(C) a tubular member within each hexagonal form for cutting holes in pieces of dough cut by the walls of said forms, the outer hexagonal forms having outer free walls, parts of said outer forms extending toward the bulging portions of the peripheral wall, partitions connecting the walls of the bulging portions with the adjacent walls of adjacent hexagonal forms, diametrically extending partitions dividing the cylindrical end of the peripheral wall into four equal portions, a central axial cylindrical inner wall and a concentric outwardly spaced cylindrical wall spaced inwardly from a cylindrical peripheral wall;

(D) radially extending partition walls between the central cylindrical wall, intermediate cylindrical wall, and the cylindrical peripheral wall dividing the interior of the cylindrical portion of the device into a plurality of forms of substantially equal size and shape, and handle means on said peripheral wall.

3. In a cutter-divider for cutting pieces of dough for doughnuts and bow-ties:

(A) a peripheral wall, one end portion of said peripheral wall comprising arcuate portions of a cylinder and outwardly bulging arcuate parts connecting said arcuate portions together, the interior space defined by the portions of the peripheral wall at the other side being divided into hexagonal forms, there being a central hexagonal form, six intermediate hexagonal forms about said central form, and a plurality of outer hexagonal forms surrounding the intermediate hexagonal forms, said forms having certain walls in common with each other and walls defining hole cutting tubular members within respective hexagonal forms, the outer group of hexagonal forms having outer free walls, parts of said outer forms extending toward the bulging portions of the peripheral wall, and partitions connecting the walls of the bulging portions with the adjacent walls of adjacent hexagonal forms.

4. In a cutter-divider for cutting out pieces of dough for cooking:

(A) a cylindrical peripheral wall, diametrically extending partitions dividing said peripheral wall into four equal portions, a central axial cylindrical inner wall and a concentric outwardly spaced intermediate cylindrical wall spaced inwardly from a cylindrical peripheral wall;

(B) and radially extending partition walls between the central cylindrical wall, intermediate cylindrical wall, and the cylindrical peripheral wall dividing the interior of the cylindrical portion of the device into a plurality of forms of substantially equal size and shape.

References Cited by the Examiner

UNITED STATES PATENTS

| 337,329 | 3/1886 | Hewett | 30—301 |
|---|---|---|---|
| 1,945,755 | 2/1934 | Scruggs | 107—4.2 |
| 2,075,699 | 3/1937 | Brennan | 107—54.2 |
| 2,554,734 | 5/1951 | Gehm | 107—47 |
| 2,584,536 | 2/1952 | Belt | 17—32 |
| 2,734,465 | 2/1956 | Head | 107—54.2 |
| 2,950,693 | 8/1960 | Filiti et al. | 107—4.2 |

FOREIGN PATENTS

| 203,375 | 9/1956 | Australia. |
|---|---|---|
| 812,662 | 9/1951 | Germany. |
| 177,366 | 3/1922 | Great Britain. |
| 36,474 | 1/1923 | Norway. |

WALTER A. SCHEEL, *Primary Examiner.*

CHARLES A. WILLMUTH, *Examiner.*